United States Patent [19]
Wirt

[11] 3,995,671
[45] Dec. 7, 1976

[54] SHEAR-MECHANISM-TREE HARVESTER
[75] Inventor: Leon A. Wirt, Joliet, Ill.
[73] Assignee: Caterpillar Tractor Co., Peoria, Ill.
[22] Filed: Feb. 17, 1976
[21] Appl. No.: 658,553
[52] U.S. Cl. .............................. 144/34 E; 144/3 D; 144/309 AC
[51] Int. Cl.² ........................................ A01G 23/08
[58] Field of Search ................. 144/2 Z, 3 D, 34 R, 144/34 E, 309 AC

[56] References Cited
UNITED STATES PATENTS

| | | | |
|---|---|---|---|
| 3,590,760 | 7/1971 | Boyd | 144/34 E X |
| 3,643,712 | 2/1972 | Doel et al. | 144/3 D X |

Primary Examiner—Robert Louis Spruill
Assistant Examiner—W. D. Bray
Attorney, Agent, or Firm—Phillips, Moore, Weissenberger, Lempio & Strabala

[57] ABSTRACT

A shear mechanism includes shear members pivotally mounted to a first frame, with a second frame movable relative to the first frame, and first and second links connected to the second frame. The first and second links are also connected to the first and second shear members, and first and second cylinders are connected with the second frame and the first and second links respectively, so that actuation of the cylinders in one direction moves the links to bring the shear members together, and actuation of the cylinders in the other direction moves the links to move the shear members apart, with the second frame moving relative to the first frame upon such movement of the first and second shear members.

10 Claims, 6 Drawing Figures

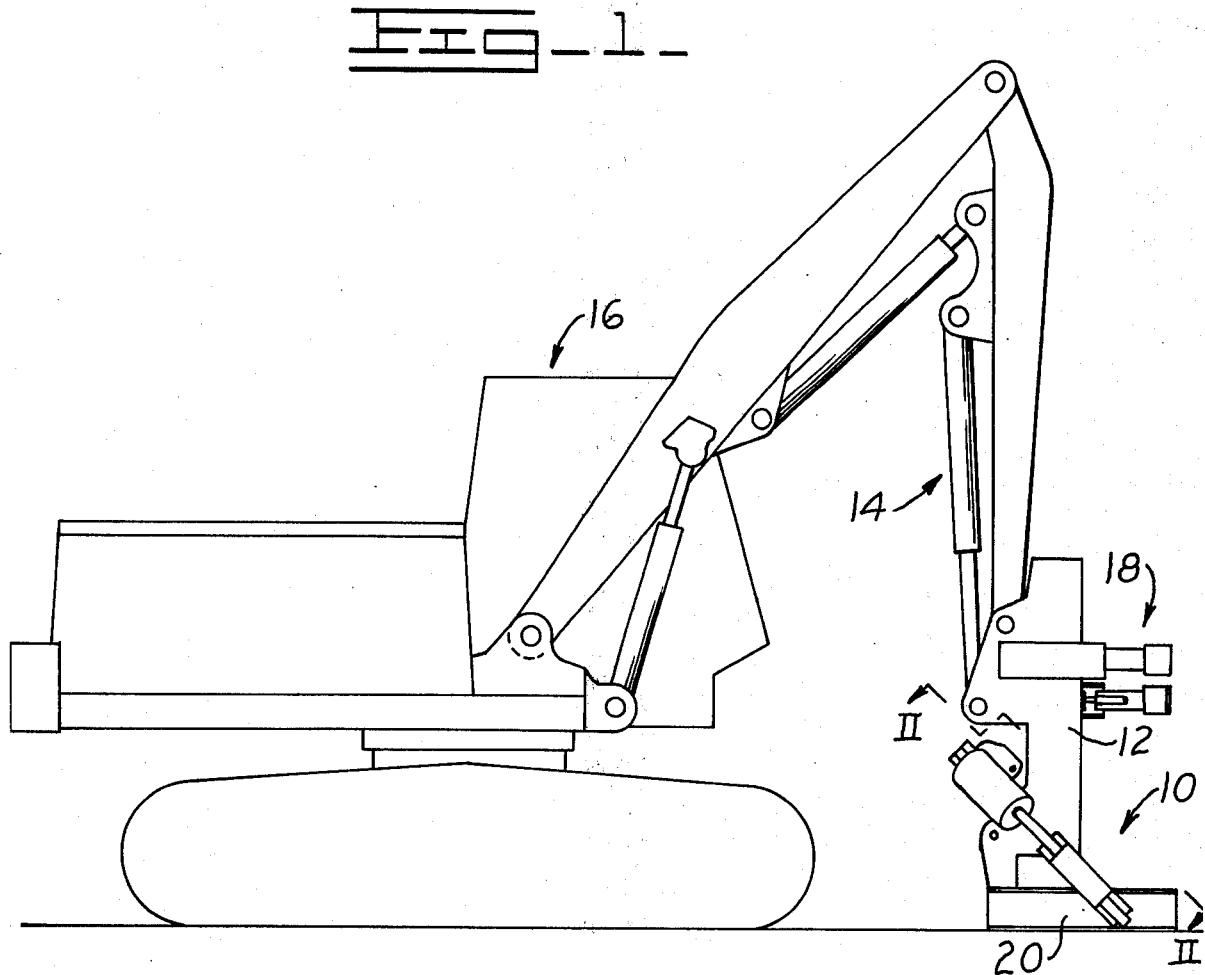

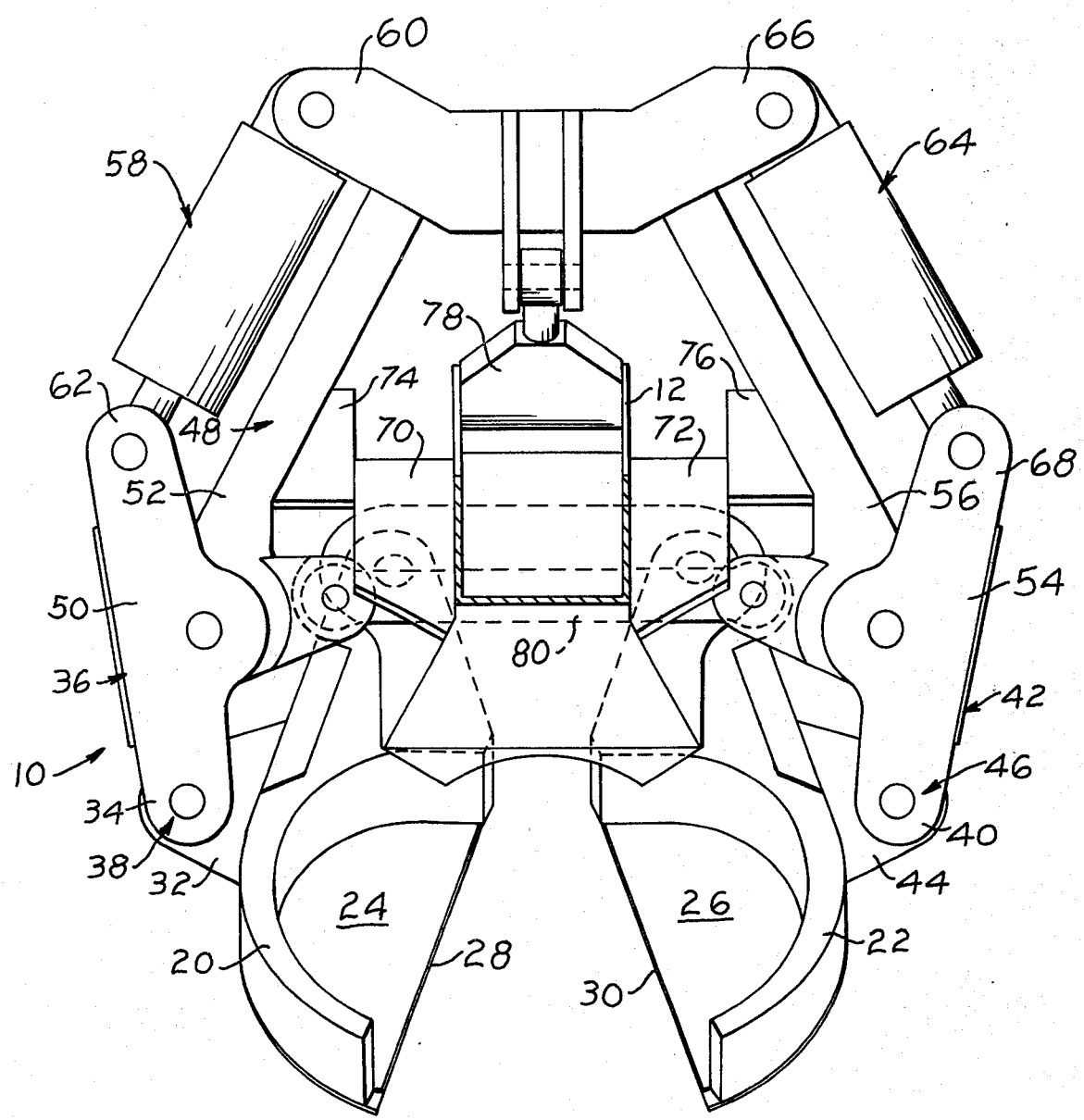

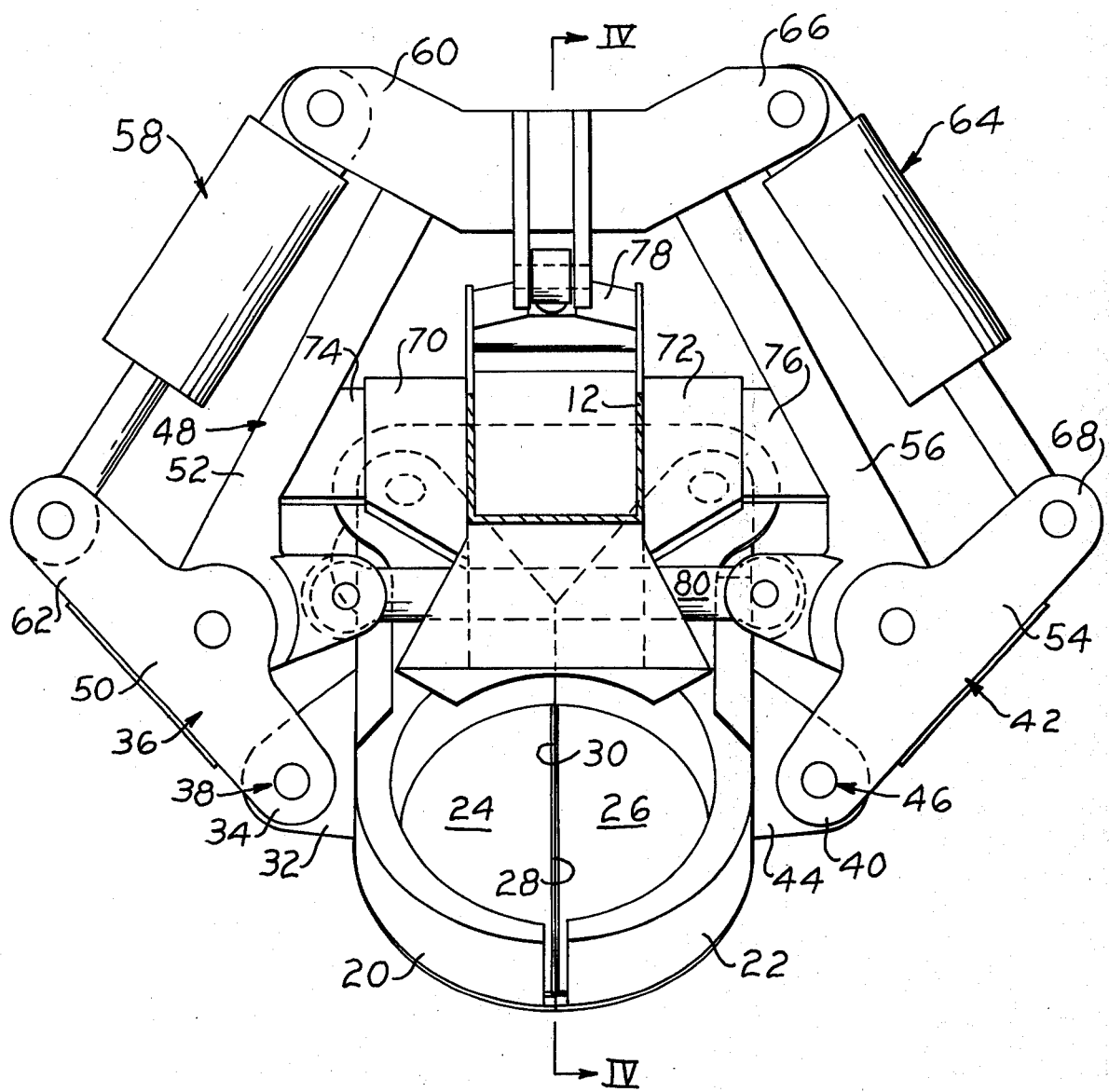

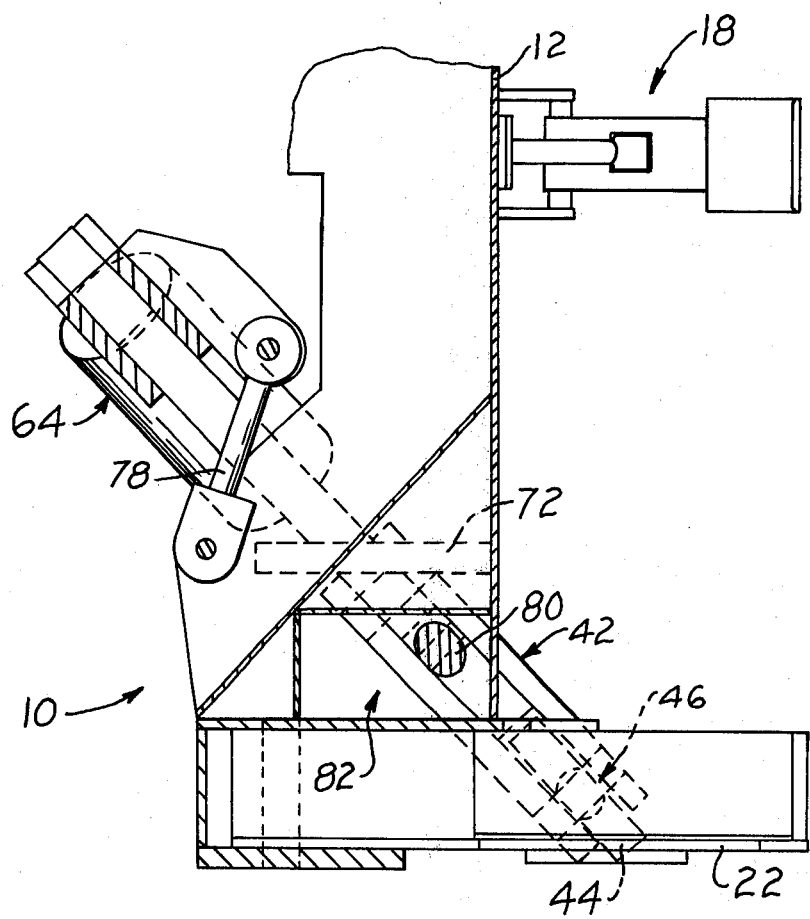
Fig_4

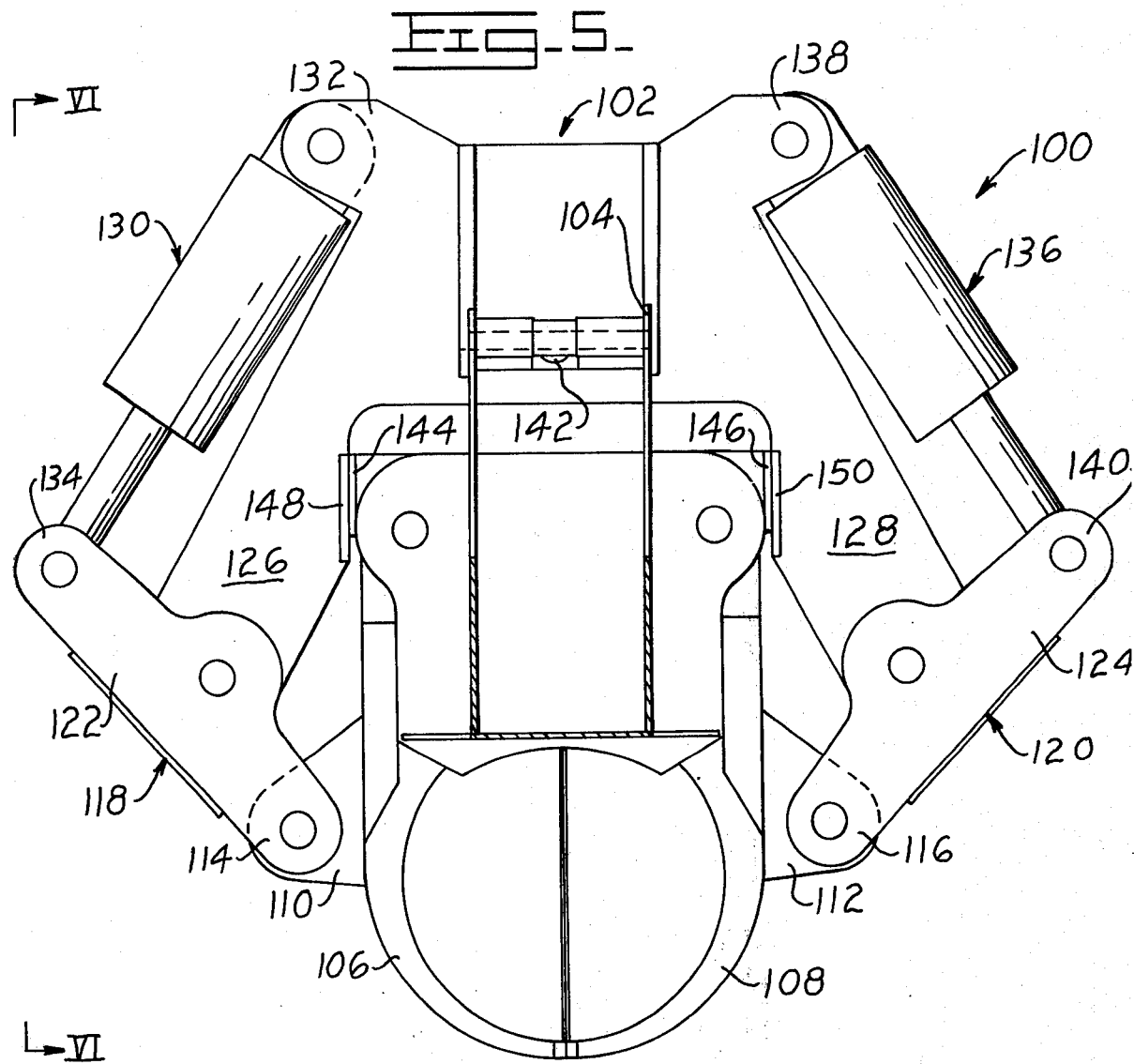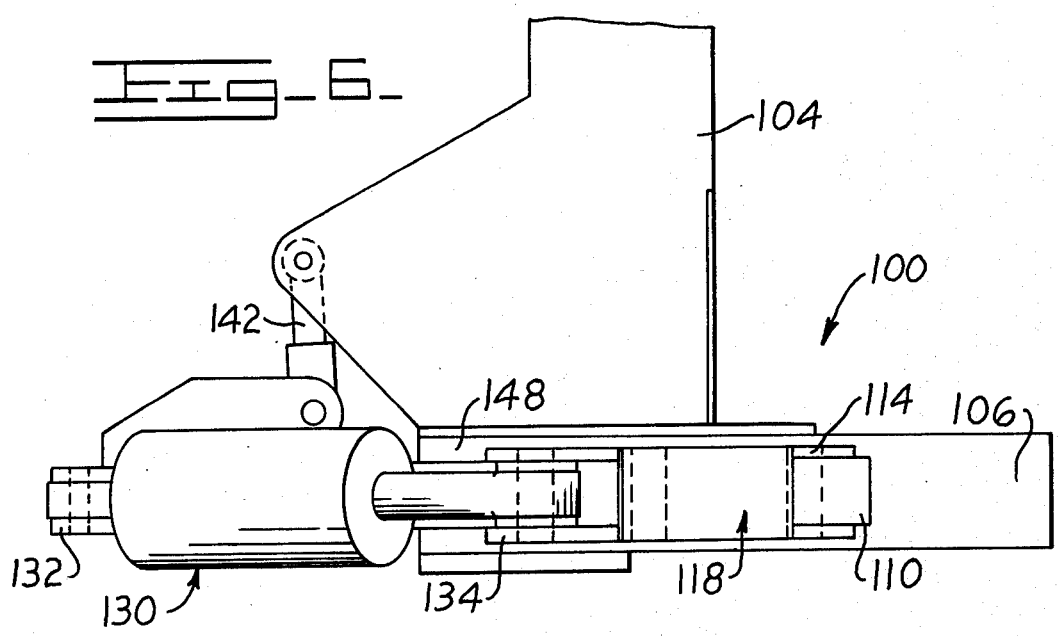

SHEAR-MECHANISM-TREE HARVESTER

BACKGROUND OF THE INVENTION

This invention relates to apparatus for cutting trees, and more particularly, to apparatus wherein shear members are moved into engagement with a tree to cut the tree.

In recent years, a number of structures have been developed wherein shear members are brought together to cut a tree adjacent its base, with the body of the tree being held by gripping members during such operation. In general, it will be understood that such structures should be capable of not only effectively cutting the tree, for example, through the proper application of force by force-applying means to the shear members, but also with advantage should be compact in design and capable of dealing properly with the extremely high forces placed thereon during the cutting operation.

U.S. Pat. No. 3,575,222 discloses a system generally along the above-stated lines. It should be noted, however, that such system utilizes a single cylinder for applying force through linkages to shear members. Similarly U.S. Pat. No. 3,837,382 utilizes a single cylinder as the means for applying force to a single shear member to cut the tree. And, U.S. Pat. No. 3,540,501 discloses a pair of cylinders for operating shear members, but with no linkage means actuated by the cylinders and with which the cylinders and shear members cooperate.

SUMMARY OF THE INVENTION

It is accordingly an object of this invention to provide a tree cutting mechanism which is extremely efficient in applying cutting force to the tree to be cut through a pair of shear members.

It is a further object of this invention to provide a shear mechanism which positions actuating cylinders above the hazardous environment, and which, while fulfilling the above objects, is extremely compact in design, and efficient in use.

It is a still further object of this invention to provide a shear mechanism which, while fulfilling the above objects, is capable of handling the relatively large forces applied thereto during the cutting of the tree in a highly effective manner.

Broadly stated, the invention comprises a shear assembly comprising first frame means, and first and second shear members pivotally mounted to the first frame means to be movable toward and away from each other. Second frame means are movable relative to the first frame means, and first and second links are pivotally connected to the second frame means. The first and second links are pivotally connected to the first and second shear members respectively. Further included are first and second cylinder means, each pivotally connected with the second frame means, the first cylinder means being pivotally connected with the first link, the second cylinder means being pivotally connected with the second link. The actuation of the first and second cylinder means in one direction actuates the links to move the shear members toward each other, the actuation of the first and second cylinder means in the other direction actuates the links to move the shear members away from each other, and means are included for guiding the movement of the second frame means relative to the first frame means during the movement of the first and second shear members toward and away from each other.

BRIEF DESCRIPTION OF THE DRAWINGS

These and other objects of the invention will become apparent from a study of the following specification and drawings, in which:

FIG. 1 is a side elevation of a vehicle incorporating a first embodiment of the inventive shear assembly;

FIG. 2 is a view taken along the line II—II of FIG. 1, with the shear members moved away from each other;

FIG. 3 is a view similar to that shown in FIG. 2, but with the shear members moved toward each other;

FIG. 4 is a sectional view taken along the line IV—IV of FIG. 3;

FIG. 5 is a plan view of a second embodiment of the inventive shear assembly; and FIG. 6 is a view taken along the line VI—VI of FIG. 5.

DESCRIPTION OF THE PREFERRED EMBODIMENTS

Shown in FIGS. 1–4 is a first embodiment of shear assembly 10. As shown in FIG. 1, the main frame 12 of such shear assembly 10 is mounted to a lift and tilt mechanism 14 in turn mounted to a vehicle 16, so that the positioning and attitude of the main frame 12 can be chosen. The main frame 12 has fixed thereto adjacent the upper portion thereof inwardly and outwardly movable grapple arms 18, as is well known. The shear assembly 10 is shown in detail in FIGS. 2–4.

As shown therein, the main frame 12 has a first shear member 20 pivotally mounted thereto, and a second shear member 22 pivotally mounted thereto. It will be seen that the shear members 20, 22 include cutting blade portions 24, 26 defining respective cutting edges 28, 30, so that upon movement of the first and second shear members 20, 22 toward each other, from an open position thereof, a cutting action of a tree positioned between the shear members 20, 22 can take place. The shear members 20, 22 are also movable away from each other through pivoting movement thereof.

The shear member 20 defines an ear 32 to which is pivotally connected the first end 34 of a link 36, with such pivot 38 actually being a ball-and-socket joint. One end 40 of a link 42 is likewise pivotally connected to an ear 44 defined by the shear member 22 by means of a ball-and-socket joint 46. A generally U-shaped frame structure 48 is disposed about a portion of the main frame 12. An intermediate portion 50 of the link 36 is pivotally mounted to the end of one limb 52 of U-shaped frame structure 48 intermediate portion 54 of the link 42 is pivotally mounted to the end of the other limb 56 of the U-shaped frame structure 48.

A first cylinder 58 interconnects an extended portion 60 of the generally U-shaped frame structure 48 and the other end 62 of the link 36, and a second cylinder 64 interconnects another extended portion 66 of the generally U-shaped frame structure 48 and the other end 68 of the link 42. The opposite ends of the cylinder 58 are pivotally connected with the extended portion 60 and link 36, and the opposite ends of the cylinder 64 are pivotally connected with the extended portion 66 and link 42.

Guide portions 70, 72 are defined by the main frame 12 and extend outwardly therefrom on opposite sides thereof. Guide portions 74, 76 are defined by the respective limbs 52, 56 of the generally U-shaped frame structure 48, and are positioned outward of and located to contact the guide portions 70, 72 respectively. A guide link 78 has one end pivotally connected to the main frame 12, and the other end extending upwardly therefrom and connected relative to the generally U-shaped frame structure 48. A bar 80 extends from one limb 52 of the U-shaped frame structure 48 to the other 56, and interconnects the limbs 52, 56. The bar 80 extends through an opening 82 (best shown in FIG. 4) defined by the main frame 12.

In the operation of the device, it will be seen that, with the generally U-shaped frame structure 48 disposed about a portion of the main frame 12, extension of the cylinders 58, 64 actuates the links 36, 42 to move the shear members 20, 22 toward each other, and retraction of the cylinders 58, 64 actuates the links 35, 42 to move the shear members 20, 22 away from each other, with the generally U-shaped frame structure 48 moving relative to the main frame 12 upon the movement of the shear members 20, 22 toward and away from each other. The movement of the generally U-shaped frame structure 48 is guided by means of the guide link 78 pivoting rearward (see FIG. 4) upon movement of the shear members 20, 22 away from each other. Likewise, the guide link 78 will pivot forward to the position shown in FIG. 4 upon movement of the shear members 20, 22 toward each other. The guide portions 70, 72, 74, 76 act as movement guiding means also, with the guide portions 74, 76 moving generally forwardly and rearwardly along the guide portions 70, 72 upon opening and closing of the shear members 20, 22. The guide portions 70, 72, 74, 76 are also appropriately positioned so that contact between, for example, guide portion 70 and guide portion 74 acts to transmit lateral loads placed on the generally U-shaped frame structure 48 to the main frame 12 of the shear assembly 10. Guide portion 72 and guide portion 76 of course act in a like manner to transmit lateral loads in the opposite direction from the generally U-shaped frame structure 48 to the main frame 12.

It is to be seen that the cylinders 58, 64, links 36, 42 amd the general overall U-shaped frame structure 48 are angled relative to the pivot axes of the shear members 20, 22, being angled rearwardly and upwardly from the shear members 20, 22 in the direction of the vehicle 16, such angling, of course, exists during operation of the assembly 10. In fact, the angling of such elements with advantage falls within the limits of from 40° to 50° relative to the pivot axes of the shear members 20, 22. Such angling raises the cylinders 58, 64 and linkage mechanism away from the ground, so that interference of operation therewith by foreign debris is less likely. Also it will be seen that such angling results in an extremely compact structure, covering a minimum of ground area. The bar 80 interconnecting the limbs 52, 56 aids in the generally U-shaped frame structure 48 being capable of handling large lateral loads placed thereon.

It is to be noted that because of the relative positioning of the links 36, 42 and cylinders 58, 64, upon extension of the cylinders 58, 64 to move the shear members 20, 22 toward each other, the cylinders 58, 64 act through continuously lengthening moments arms defined by the links 36, 42 because of the changing positions thereof relative to the generally U-shaped frame structure 48 and the shear members 20, 22, so that shearing force of the shear members 20, 22 resulting from movement of the cylinders 58, 64 and links 36, 42 increases as the shear members 20, 22 are moved toward each other.

It should also be noted that the overall structure covers a relatively small ground area, because of the angling of the components thereof described above, and because of the overall efficiently designed cylinder and link system, in association with a frame structure 48 movable relative to the main frame 12. It is also insured that lateral loads on certain components are properly handled, being insured that the lateral loads are not transferred to the pivots of the guide link 78.

Shown in FIGS. 5 and 6 is another embodiment of the shear assembly 100. In this embodiment, a generally U-shaped frame structure 102 is again movably disposed about a portion of the main frame 104. Shear members 106, 108 are pivotally mounted to the main frame 104, so as to be movable toward and away from each other. The shear members 106, 108 define ears 110, 112 to which are pivotally connected the ends 114, 116 of links 118, 120 respectively. The intermediate portions 122, 124 of the links 118, 120 are pivotally connected to the extending ends of the limbs 126, 128 of the generally U-shaped frame structure 102. A cylinder 130 is pivotally connected to an extended portion 132 of the generally U-shaped frame structure 102 and the other end 134 of the link 118 and a cylinder 136 is pivotally connected to another extended portion 138 of the generally U-shaped frame structure 102 and to the other end 140 of the link 120.

A guide link 142 interconnects the generally U-shaped frame structure 102 and the main frame 104, being pivotally connected to both the main frame 104 and generally U-shaped frame structure 102. The main frame 104 defines guide portions 144, 146 in the form of wear plates, and the generally U-shaped frame structure 102 defines guide portions 148, 150 in the form of wear plates which are positioned outward of and positioned to contact the guide portions 144, 146 respectively. The wear plates 144, 146, 148, 150 resist lateral loads acting on the shear members 106, 108 and keep such lateral loads from acting on the pivot connections of the guide link 142.

It should be understood that other guide means replacing the guide plates could be employed, such as channels with rollers, or T-shaped slides and guides. It should also be noted that in this embodiment, there is no bar which interconnects the extending ends of the generally U-shaped frame structure 102. In this embodiment, the generally U-shaped frame structure 102 is designed with sufficient strength to accept the loads imposed upon it without utilization of such a bar. Since no such bar exists, there need not be an opening in the main frame 104 as in the previous embodiment, and the main frame 104 is therefore somewhat stronger than in the previous embodiment.

Also in this embodiment, the cylinders 130, 136, links 118, 120 and the general overall U-shaped frame structure 102 are angled relative to the pivot axes of the shear members 106, 108 generally at right angles thereto, so as to be positioned generally parallel to the ground during the cutting operation.

In either embodiment, it will be understood that the vehicle is moved to a position so that the tree is positioned between the open shear members. The tree is gripped by the grapple arms, and the cylinders are extended to bring the shear members toward each other to cut the tree. In either embodiment, such operation takes place in an extremely efficient manner, by means of a highly compact and effective structure.

I claim:

1. A shear assembly comprising:

first frame means;

first and second shear members pivotably mounted to the first frame means to be movable toward and away from each other;

second frame means movable relative to said first frame means;

first and second links pivotably connected to the second frame means;

the first and second links being pivotably connected to the first and second shear members respectively;

first and second cylinder means, each pivotably connected with the second frame means, the first cylinder means being pivotably connected with the first link, the second cylinder means being pivotably connected with the second link;

the actuation of the first and second cylinder means in one direction actuating the links to move the shear members toward each other, the actuation of the first and second cylinder means in the other direction actuating the links to move the shear members away from each other;

the second frame means being moveable relative to the first frame means upon said movement of the first and second shear members toward and away from each other; and means for guiding said movement of the second frame means relative to the first frame means during said movement of the first and second shear members toward and away from each other.

2. The shear assembly of claim 1 wherein the second frame means comprise a generally U-shaped frame structure disposed about a portion of the first frame means.

3. The shear assembly of claim 2 and further comprising bar means interconnecting the limbs of the generally U-shaped frame structure.

4. The shear assembly of claim 3 wherein the first frame means defines an opening through which the bar means extend from one limb of the generally U-shaped frame structure to the other.

5. The shear assembly of claim 1 wherein the means for guiding said movement of the second frame means relative to the first frame means comprise a guide link, one end of which is pivotably connected relative to the first frame means and the other end of which is pivotably connected relative to the second frame means.

6. The shear assembly of claim 2 wherein the means for guiding said movement of the second frame means relative to the first frame means comprise first and second guide portions defined by the second frame means, and third and fourth guide portions defined by the first frame means, the first and second guide portions being positioned outward of and positioned to contact the third and fourth guide portions respectively.

7. The shear assembly of claim 6 wherein the means for guiding said movement of the second frame means relative to the first frame means further comprise a guide link one end of which is pivotably connected relative to the first frame means and the other end of which is pivotably connected relative to the second frame means.

8. The shear assembly of claim 1 wherein the first and second cylinder means are angled relative to the pivot axes of the first and second shear members within the limits of from 40° to 50° relative thereto.

9. The shear assembly of claim 1 wherein the first and second cylinder means are angled relative to the pivot axes of the first and second shear members generally at right angles thereto.

10. The shear assembly of claim 1 and means defined by the relative positions of the first and second links and first and second cylinder means for providing that upon actuation of the cylinder means to move the shear members toward each other, shearing force of the shear members resulting from movement of the cylinder means and links increases as the shear members are moved toward each other.

* * * * *